(No Model.)
N. C. BASSETT.
DYNAMO ELECTRIC MACHINE OR MOTOR.
No. 516,792. Patented Mar. 20, 1894.
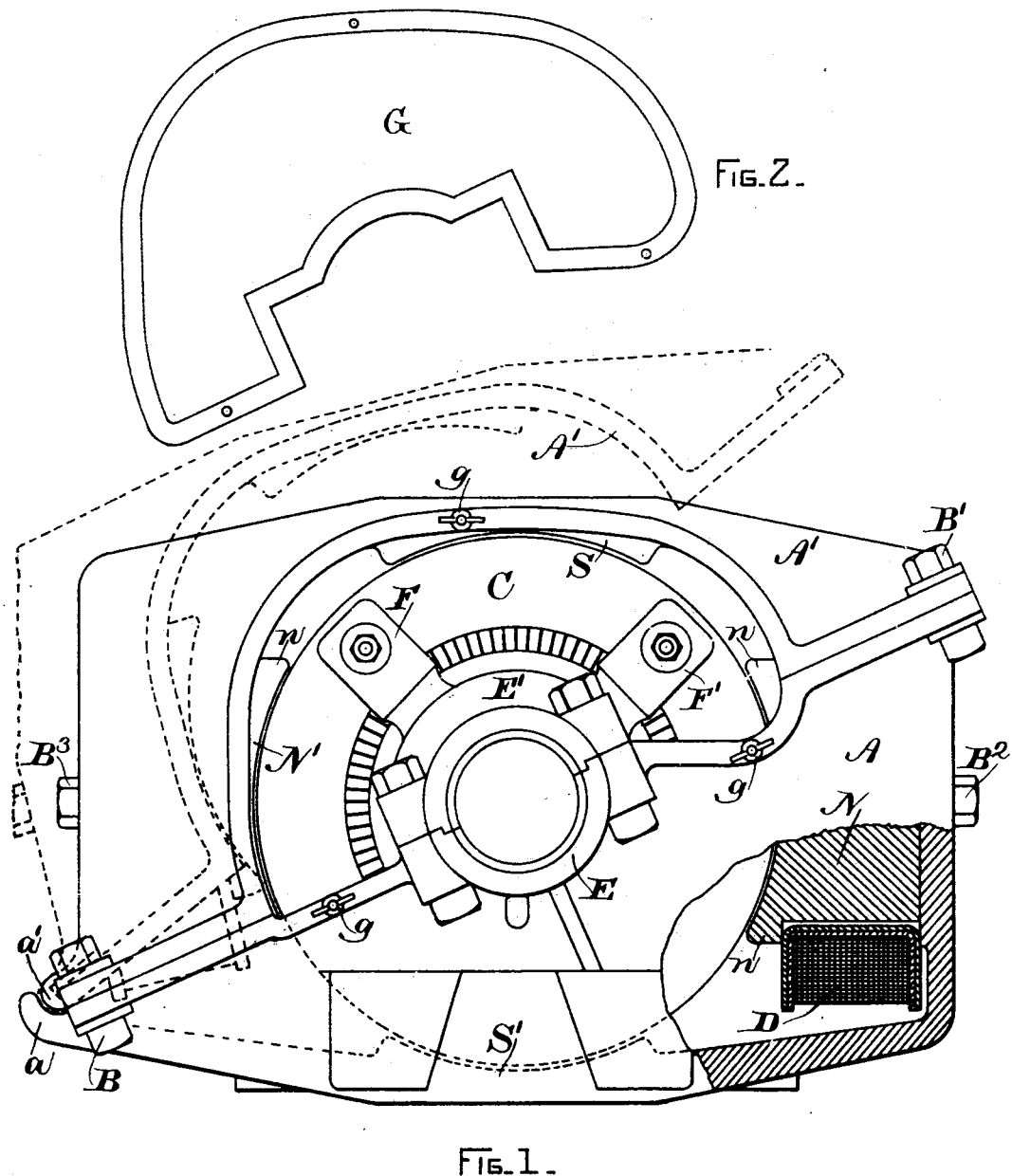
Witnesses.
A. F. Macdonald.
John H. Gibboney
Inventors.
Norman C. Bassett
By Bentley & Blodgett
Attys.

UNITED STATES PATENT OFFICE.

NORMAN C. BASSETT, OF LYNN, ASSIGNOR TO THE GENERAL ELECTRIC COMPANY, OF BOSTON, MASSACHUSETTS.

DYNAMO-ELECTRIC MACHINE OR MOTOR.

SPECIFICATION forming part of Letters Patent No. 516,792, dated March 20, 1894.

Application filed August 31, 1893. Serial No. 484,421. (No model.)

*To all whom it may concern:*

Be it known that I, NORMAN C. BASSETT, a citizen of the United States, residing at Lynn, in the county of Essex and State of Massachusetts, have invented a certain new and useful Improvement in Electric Machines, of which the following is a specification.

My invention relates to improvements in the construction of field magnets for electric machines and is of especial importance in the construction of electric motors where it is necessary to employ as large an armature as possible while at the same time the space which the motor is to occupy is limited. Such conditions are found in the case of electric motors applied to the propulsion of street railway cars, where the armature must needs be of ample size to give the requisite torque with the minimum number of speed reducing gears, and where, also, the space for the motor underneath the car is contracted.

The invention also embodies improvements in the construction of multipolar electric machines, dynamos and motors, whereby ready access may be had to the armature or interior parts of the motor which are, however, thoroughly protected from injury when all the parts are in the normal condition of service.

In the drawings, Figure 1 is a side elevation, partly in section, and Fig. 2 is a view of the removable cover.

The frame of the machine is composed of two castings, A, A' having, approximately, the shape of a right-angle-triangle. These constitute wholly or in part the field magnet structure of the motor, and are secured together, as by bolts B, B', in such manner as to form a rectangular casing or box surrounding the armature, C. Projecting interiorly from the castings are four poles N, N' and S, S'. These poles may or may not be integral with the frames, but for the particular use mentioned it is preferred to make the short poles S, S' one with the frame, and the poles N, N' of separate portions bolted to the frames by bolts $B^2$, $B^3$. In the case of small machines built in accordance with this invention the poles N, N' would preferably be cast integrally with the frames, but in large machines it is best to have them separate, the inner ends of the poles having a retaining lip or flange $n$ to hold the field spools or bobbins in position. The poles N, N' are wound with coils D and are of the same polarity, while the poles S, S' are left unwound and constitute the return of the magnetic circuit for the poles N, N' through the armature, or, in other words, are consequent poles to the others. The unwound or short poles lie in that direction in which the greatest economy of space must be had, and, as applied to a railway vehicle, this would of course be the space between the car body and the track. Journal bearings for the shaft are readily provided as shown at E in the median diagonal line which divides the field magnet frames, a cap or upper bearing E' holds the shaft in place, and arms F, F' extending from the upper bearing at right angles to each other, afford supports for the brush holders, the upper casting, if desired, having one side left open, as shown, so that the brushes and commutator are easily accessible. When necessary this opening may be closed by a removable lid or door G fastened in any suitable manner as by wing nuts $g$. The commutator is of course supposed to be cross-connected with only two brushes, as shown. When the motor is exposed to dirt, &c., the lower part of the field casing A is entirely closed. When for any purpose it is desired to remove the armature the bolts B, B' are loosened and then one-half of the frame, as A', may be swung back, as shown in the dotted lines, exposing the interior. For this purpose the two field magnet portions A and A' might be hinged together at either or both ends, but it is preferred to form an upwardly extending lip or lug, $a$, on the lower frame A adapted to engage with a tongue or projection $a'$ on the frame A'. This has the advantage that, when the motor is disengaged from the car, the upper frame may be lifted entirely off and the armature removed without the necessity of elevating it to as great a height as would be the case were the median line or division between the field frames horizontal. The field frame structure herein shown may likewise be used in the construction of stationary motors to be used in positions where it is not essential to so thoroughly protect the armature, and in this case of course the extension of the casting so as to completely surround the field poles and armature need not be carried out.

Having thus described my invention, what I claim as new, and wish to secure by Letters Patent of the United States, is—

1. In a dynamo electric machine, a field magnet frame substantially rectangular in longitudinal elevation, and composed of two parts united on a diagonal of said rectangle.

2. A dynamo electric machine, having a field magnet frame composed of two substantially triangular parts united along their longer sides, the lower part having a half bearing for the armature shaft in said longer side.

3. A dynamo electric machine having a field magnet frame composed of two substantially triangular parts meeting along their longer sides, the lower part having a shaft bearing in said longer side, and the upper part having one side left open to give access to the commutator and brushes.

4. In a dynamo electric machine, a shaft bearing having a cap provided with arms serving as supports for the brush holders.

5. A dynamo electric machine having a field magnet frame composed of two substantially triangular parts meeting along their longer sides and hinged together at one end.

6. A dynamo electric machine having a field magnet frame composed of two substantially triangular parts meeting along their longer sides, the lower part having at one end a lip, and the upper part having a projection resting in said lip.

7. A field magnet frame for a multipolar dynamo electric machine, having shallow consequent pole pieces cast integral with its upper and lower sides, and longer core pieces detachably fastened to each end.

In witness whereof I have hereunto set my hand this 29th day of August, 1893.

NORMAN C. BASSETT.

Witnesses:
JOHN W. GIBBONEY,
BENJAMIN B. HULL.